March 8, 1927.
H. V. SHIRLEY
CHAIN
Filed Nov. 15, 1923
1,620,613
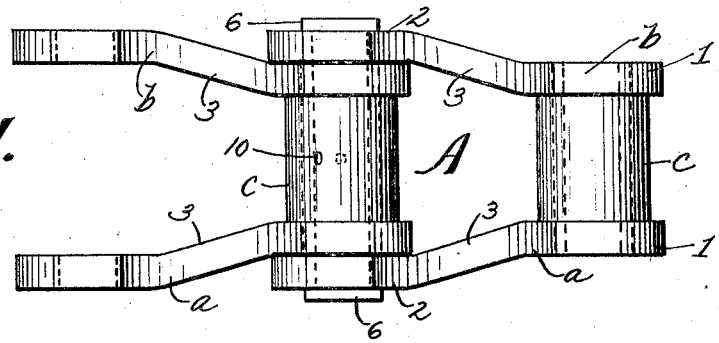
Fig. 1.
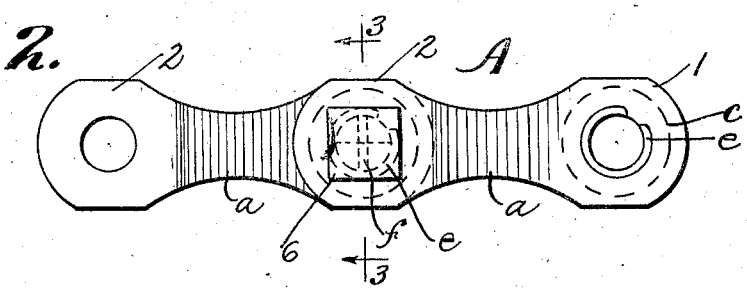
Fig. 2.
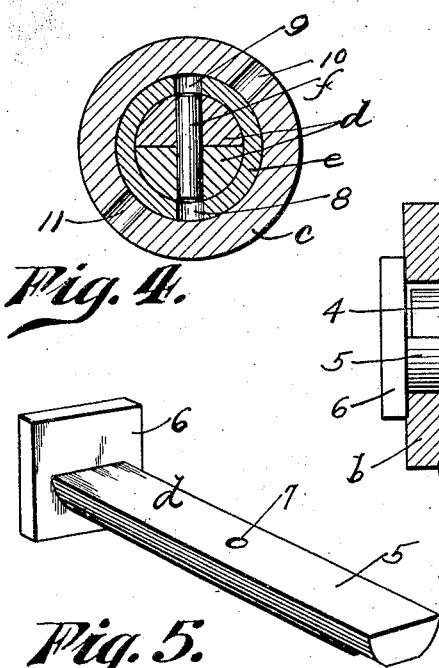
Fig. 4.
Fig. 5.
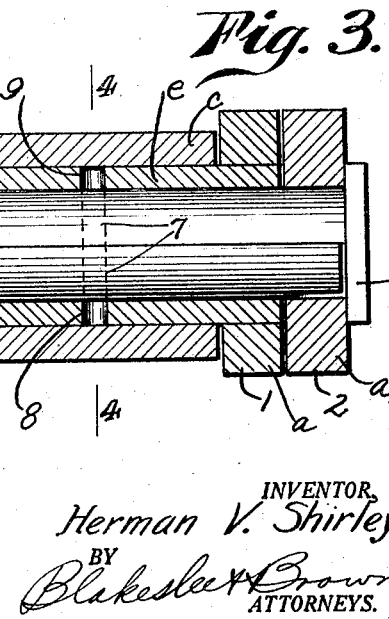
Fig. 3.
INVENTOR,
Herman V. Shirley;
BY Blakeslee & Brown
ATTORNEYS.

Patented Mar. 8, 1927.

1,620,613

UNITED STATES PATENT OFFICE.

HERMAN V. SHIRLEY, OF LONG BEACH, CALIFORNIA.

CHAIN.

Application filed November 15, 1923. Serial No. 674,868.

This invention relates to chains, and particularly to sprocket chains for heavy service. A chain of the type about to be described is of great utility and usefulness in oil well practice where great stresses and strains are imposed upon sprocket chain members.

The invention has for an object the provision of a chain which may be easily assembled or disassembled for any purpose whatsoever, such as the replacement of links or the like, which is easy to manufacture, positive in results obtained by its use, and generally efficient so far as serviceability and operating factors are concerned.

In practicing the invention I may provide chain links joined in connected series by means of a pin or pins upon which are carried rollers between each pair of links. The pin for holding the links is preferably split longitudinally into two halves, which halves are held when in cooperative working relation by a small pin passed through aligned transverse bores in the said halves. The roller member carried on the pin is formed with a transverse bore or bores through which bore or bores the short pin may be passed for passage within the aligned bores in the halves of the pin. Thus as the chain is used the rollers are rotated and the pin for holding the halves together is not permitted to escape from its position.

With the above and other objects in view, the invention consists in the novel and useful provision, formation, construction, association and relative arrangement of parts, members and features, all as shown in one of its embodiments in the accompanying drawing, described generally and finally pointed out in claims.

In the drawing:

Figure 1 is a top plan view of a connected series of links and illustrating the invention in one of its embodiments;

Figure 2 is a side elevation of the chain shown in Figure 1;

Figure 3 is a cross sectional view taken on the line 3—3 of Figure 2;

Figure 4 is a transverse sectional view taken on the line 4—4 of Figure 3; Figures 3 and 4 being on an enlarged scale; and, Figure 5 is a perspective view of one of the halves of the pin of the chain.

Corresponding parts in all the figures are designated by the same reference characters.

Referring with particularity to the drawing, the improved chain as disclosed is designated as an entirety by A of which $a$ and $b$ are links, $c$ a roller member, $d$, a pin, and $e$ a bushing. The links $a$ and $b$ are similarly formed, both having transverse perforated or bored heads 1 and 2, the said heads being bowed as shown at 3, so that when the chain is assembled the head portions 2 of the links are further apart than the head portions 1 thereof, as shown in Figure 1. The pin $d$ is made in longitudinal split cooperating halves as shown in Figs. 3, 4 and 5, at 4 and 5, and each half of the pin is formed with a head 6, the head in the showing being square, although any other form might suffice. Each pin is provided with a transverse bore 7, which bores are adapted to align when the halves of the pin are in position of service. It is to be noted that the heads 1 have their transverse bores slightly larger than the bores in the heads 2, so that such bores may accommodate the bushing member $e$. The said bushing $e$ is adapted to surround the pin $d$ and such bushing is provided with aligned transverse bores 8 and 9 which may register with the transverse bores 7 in the pin $d$ when the pin or bushing is rotated to a certain position. The roller member $c$ is carried upon the bushing $e$ and between the heads 1 of the links $a$ and $b$, and such roller is provided with aligned transverse bores 10 and 11 and such bores are adapted to register, when the roller is properly turned, with the aligned bores 8 and 9 of the bushing and the aligned bores 7 of the pin. In assembling the chain with reference to Figure 4, it is to be noted that the aligned bores 8 and 9 of the bushing may be aligned with the bores 7 of the pin by rotating the halves of the pin. The two links $a$ and $b$ first have their heads 1 in spaced relation and adjacent the heads 2 of the next succeeding link elements, (see Fig.

1). The bushing is then passed through the bores in the heads 1 of the links *a* and *b*, and may be flanged at its ends as shown in Figure 2 so as to hold the bushing in place. The roller, prior to this flanging of the ends of the bushing, is placed upon such bushing, and the two halves of the pin may then be passed through the bushing and the bores in the heads 1 and 2 of the links, as shown in Figure 1. The roller *c* may be so turned as to align with either the bore 10 or 11 of the bushing and a small pin *f* approximately of a length equal to the diameter of the pin *d* may then be passed through one of the bores in the roller and in the bushing, and the pin *d* turned slightly if necessary so that the pin *f* may be passed into the bores 7 whereby it will assume a position similar to that shown in Fig. 4.

It will thus be seen that the roller *c* may be turned, and it is practically impossible for the small pin *f* to become dislodged from the pin *d*. The square heads 6 of the halves of the pin cooperate with the heads 2 of the links *a* and *b* and hold such links in position of service. It is a small matter to remove the pin *f* from the halves of the pin *d* by again aligning the transverse bores in the roller with the bores in the bushing and the pin *d*, so that the same may be knocked from its position. The links may be rapidly assembled and there are few parts to become worn. The method depicted is simpler than the use of cotter pins at the end of the pins. Furthermore, a pin such as shown at *f* may be of heavier construction and there is little chance of a shearing of such pin. It is of course possible to provide as many bores as desired through the pin and roller so that other small pins may be inserted through the main pin in case the necessity should arise.

It is obvious that various changes and modifications may be made in practicing the invention, in departure from the particular showing of the drawing, without departing from the true spirit of the invention.

Having thus disclosed my invention, I claim and desire to secure by Letters Patent:

1. A chain of the character disclosed, having in combination, two spaced links, a roller adapted to be interposed between such links, and a pin joined to such links and carrying such roller; such pin and such roller being provided with transverse bores which lie between the two spaced links and which are adapted to align when the roller is in a given position upon such pin, such pin being formed in cooperative halves, there being means adapted to be inserted in the bores of such halves for holding the pin in position of service to such links.

2. In a chain, the combination, of two spaced links, a pin between such links, said pin being formed in cooperative halves, each one of said halves being formed with a transverse bore and means adapted to be received within such transverse bores of the two halves for holding the pin in position of service to such links; each half of the said pin being formed with a head, which heads are adapted to engage opposite sides of the links.

3. In a chain, the combination, of two spaced links, a pin between such links, said pin being formed in cooperative halves, each of said halves being formed with a transverse bore and means adapted to be received within such transverse bores of the two halves for holding the pin in position of service to such links; there being a roller carried upon such pin, such roller being formed with a transverse bore adapted to align with the bores in the halves of the pin whereby the means for holding the pin in position of service may be inserted.

4. In a chain, the combination, of two spaced links, a pin between such links, said pin being formed in cooperative halves, each of said halves being formed with a transverse bore and means adapted to be received within such transverse bores of the two halves for holding the pin in position of service to such links; there being a roller carried upon such pin, said roller being formed with a transverse bore adapted to align with the bores in the halves of the pin whereby the means for holding the pin in position of service may be inserted; there also being a bushing between the roller and the pin, and such bushing being formed with a transverse bore adapted to align with the transverse bore in the roller when the roller is in one position.

5. A chain of the character disclosed having in combination two spaced links, a bushing, a roller, such bushing and roller being adapted to be introduced between such links, a pin joined to such links receivable within the bushing; such pin, bushing and roller respectively being provided with aligned transverse bores; such pin being formed in cooperative halves; there being means adapted to be inserted in the bores of such halves of the pin for holding the pin in position of service within the bushing.

6. In a chain, the combination, of two spaced links, a pin between such links, a bushing formed with a transverse bore surrounding the pin, said pin being formed in cooperative halves, each of said halves being formed with a transverse bore, and means adapted to be passed through the transverse bore of the bushing and received within said transverse bores of the two halves for holding the pin in position of service to such links.

7. In a chain, the combination, of two spaced links, a pin, a bushing surrounding the pin, said pin being formed in cooperative halves, each of said halves being formed with a transverse bore, and means adapted to be received within such transverse bores of the two halves for holding the pin in position of service to such links; there being a roller carried upon the bushing, such bushing and roller being respectively formed with a transverse bore adapted to align when in a certain position with the bores in the halves of the pin, whereby the means for holding the pin in position of service may be inserted.

In testimony whereof, I have signed my name to this specification.

HERMAN V. SHIRLEY.